Nov. 15, 1938.  A. PETELER  2,136,460
SHOCK ABSORBER VALVE
Filed Dec. 22, 1937
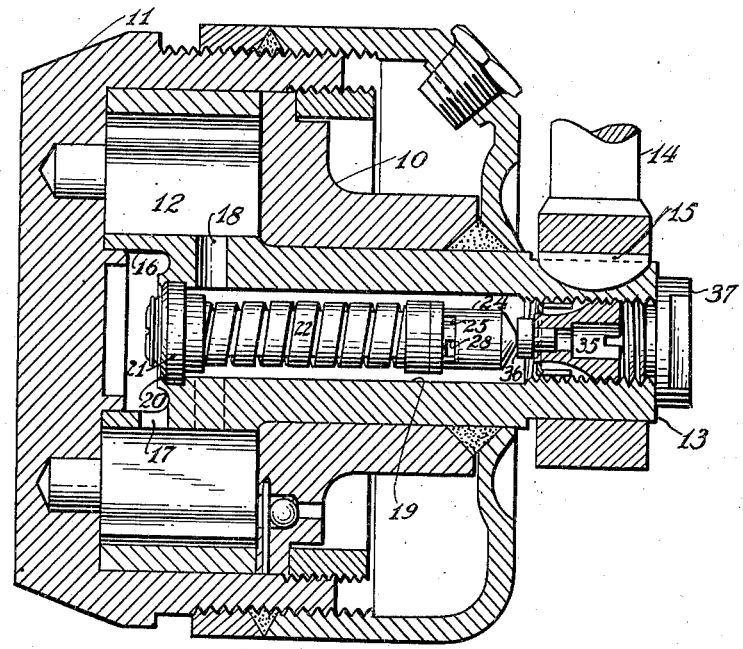
INVENTOR:
Adolph Peteler
BY
ATTORNEY Patented Nov. 15, 1938

2,136,460

UNITED STATES PATENT OFFICE 2,136,460

SHOCK ABSORBER VALVE

Adolph Peteler, Freeport, N. Y.

Application December 22, 1937, Serial No. 181,102

7 Claims. (Cl. 188—100)

My invention relates to hydraulic shock absorbers, and more particularly to improvements in valve structure assemblies of the type described and illustrated in my Patent No. 2,091,830, issued August 31, 1937. From a broader aspect, the invention comprises improvements in my other Patents Numbers 2,063,621; 1,972,949; 1,924,372 and 1,924,373.

In the first mentioned patent above, No. 2,091,830, I show a temperature responsive valve for controlling fluid flow in a hydraulic shock absorber, the temperature control being effected by a helical bimetal thermostat effective to move a ported sleeve in a circumferential sense with respect to a ported tube embraced by the sleeve. Additionally, means are provided for adjusting or calibrating the effective port opening, the adjusting means being susceptible to service adjustment. A preferred service for a device of this kind is in automotive vehicles, the thermostat serving to make shock absorber action uniform in effect regardless of the temperature at which the shock absorber is operating. The adjustment provided in the shock absorber of the prior patent is, in effect, a calibrating adjustment whereby the port opening may be pre-set to a specific size under any certain temperature condition, the relative size of the port opening specifically varying with temperature conditions. If the adjustment provided for the valve is available to the average automotive operator or service personnel, it is subject to meddling with consequent possibility of mal-adjustment, upsetting the initial factory calibration which has been accomplished under controlled conditions. This is disadvantageous, although it is appreciated that shock absorber adjustment may at times be necessary for the purpose of increasing or decreasing the stiffness of action of the shock absorber in accordance with load or speed conditions under which it may be desired to use the motor vehicle.

Accordingly, an object of this invention is to provide a thermostatic valve assembly wherein the thermostatic calibration or adjustment may be pre-set under controlled conditions without possibility of further adjustment or meddling, and wherein an auxiliary adjustment is provided to control the stiffness of action of the shock absorber. This stiffness adjustment is entirely independent of the thermostatic calibration.

A further object of the invention is to so organize the valve assembly as to permit of manual adjustment of the stiffness characteristics of the shock absorber and to provide an independent automatic temperature adjustment of the orifice in response to temperature changes.

A further object of the invention is to so coordinate the two adjustments that one is available for average service use while the other is only available upon complete disassembly of the shock absorber unit.

A further object is to so coordinate the adjustments that the thermostatically controlled valve will function freely at all times, to the elimination of jamming, bending, or misalignment, the elements of the device being so arranged that close manufacturing tolerances are not essential to the successful operation of the device.

Further objects will be apparent from a reading of the annexed specification and claims, together with an examination of the accompanying drawing, in which:

Fig. 1 is an axial section through the body of a vane type hydraulic shock absorber incorporating the invention;

Fig. 2 is an end elevation of the vane element and part of the valve assembly, and Fig. 3 is an axial section through the thermostatic valve assembly.

The shock absorber to which my invention is adapted to be applied may be of any type, but for illustration, is of the vane type disclosed in certain of the copending applications above referred to. The shock absorber unit per se is not a part of the invention, but briefly comprises, as shown in Fig. 1, a casing 10 fitted to a housing 11 to provide an annular space within which vanes 12 are located, the vanes being carried by a shaft 13 borne by the casing 10. The right end of the shaft carries a shock absorber lever 14, the latter being keyed to the shaft as at 15, while the inner (left) end of the shaft is provided with an enlarged end recess 16 having radial openings 17 and 18 communicating respectively with the enlarged recess 16 and with a bore 19 in the shaft, and with the chambers in the housing 11. At the inner end of the bore 19, an intermediate recess 20 is formed, to which is fitted a collar 21, the material of the shaft being peened over the collar to hold it fixedly in position. The collar carries a helically formed bimetal thermostat element 22 extending into the bore 19 (toward the right) and carrying at its other end a sleeve 24 having a rectangularly shaped port 25 in the wall thereof and having an end closure 26. Within the sleeve 24 and the thermostat element 22 is a tube 27, said tube having a rectangular port 28 in substantial registry with the port 25, the tube extending leftwardly as shown, into fitting engagement with a drilling in the collar 21, as at 30. The tube 27 and the bore of the collar 21 are tapered as at 31 to prevent leftward movement of the tube relative to the collar, and the tube is flanged as at 32, over a spring washer 33, to prevent movement to the right, of the tube 27 with respect to the collar 21. Thus, the tube is axially located with respect to the collar 21, but turning of the tube with respect to the collar may be accomplished when the valve assembly is removed from the shock absorber, as in Fig. 3, for calibration purposes.

It will be noted that the turns of the helical thermostat element 22 are axially spaced, and the element is capable of axial resilience in the same manner as a helical spring. The normal position of the sleeve 24 relative to the tube 27, with the element 22 axially unloaded, will be such that the port 25 lies somewhat to the right of the port 28, as shown in Fig. 3, so that the ports overlap in a longitudinal sense, limiting the effective port area between the ports 25 and 28 to less than the total area of either.

In the operation of the shock absorber, fluid may flow from a shock absorber chamber into the bore 19 through the opening 18, thence through the ports 25 and 28, leftwardly through the tube 27, and to another shock absorber chamber through the opening 17. This flow would be effective for one direction of rotation of the lever 14, while reverse flow would take place for opposite rotation of the lever 14. Since working fluid flows through the bore 19, the thermostat is continually bathed and quickly responds to temperature changes in the fluid.

The shock absorber shaft 13 is provided with a screw-threaded bore at its right hand end within which a screw 35 is threaded, said screw having an abutment button 36 for engagement with the end closure 26 of the sleeve 24. The screw 35 is covered by a protective screw cap 37 engaging the outermost end of the threaded opening.

It will now be seen that the screw 35 may be adjusted axially to cause the button 36 to press upon the cap 26 of the sleeve 24 to adjust the longitudinal registry of the ports 25 and 28. The point contact, at 39, between the button 36 and the cap 26, affords a substantially non-frictional joint to permit of free turning of the sleeve 24 in accordance with temperature changes in the thermostat element 22.

It will now be seen that changes in temperature of the element 22 will effect rotational movement of the sleeve 24 to vary the circumferential extent of the registry between the ports 25 and 28 without changing the longitudinal extent of such registry. The initial temperature adjustment and calibration made upon assembly of the instrument, will comprise the circumferential positioning of the tube 27 with respect to the collar 21. Thereafter, the thermostat valve unit is inserted in the shock absorber, and this temperature adjustment is not available for further manipulation. However, stiffness of action of the shock absorber may be adjusted by screwing in or out on the screw 35 to change the extent of longitudinal registry of the ports 25 and 28, this adjustment having no effect whatsoever on the temperature calibration. As pointed out in the objects of the invention, the axial adjustment afforded by the screw 35 permits of shock absorber adjustment to varying degrees of stiffness in accordance with the speed and load characteristics of the vehicle to which it is to be applied. For instance, the standard shock absorber unit as here shown, may be assembled and calibrated and may subsequently be used on a plurality of types and weights of vehicles without design changes, the degree of stiffness needed for the shock absorber for an individual vehicle being obtainable by adjustment of the screw 35. In effect, this invention affords a two-phase adjustment of a thermostat shock absorber valve, one phase being a temperature calibration, and the other phase being a stiffness calibration, each phase of adjustment being substantially independent one from the other.

It will be noted that the sleeve 24 need only be fitted closely to the tube 27 to permit of a good fit of the elements adjacent the ports 25 and 28. The sleeve 24 is self-aligned upon the tube, since the resilience of the thermostat element 22 will permit of axial mal-adjustment between the mounting collar 21 and the sleeve. Likewise, the flat face of the button 36 in connection with the substantially pointed end of the cap 26 permits of axial mal-adjustment of these elements without causing any binding of the sleeve 24 relative to the tube 27. Thus, the sleeve 24 is free to move rotationally upon the tube 27 in response to temperature changes.

In certain of my prior art patents, I show an axial temperture adjustment effected by a close wound helical thermostat, the temperature adjustment being afforded by axial movement of one end of the thermostat with respect to a valve seat to change the effective area of opening. The present construction is an improvement over the referred to construction in that the temperature adjustment is circumferential rather than axial, while in the present instance, additional axial adjustment is provided for stiffness calibration of the shock absorber.

Although I have shown the present invention as applied to a shock absorber suitable for automotive purposes, I consider that the invention is applicable to a variety of other uses, and it is not intended that the application of the valve of this invention be limited to any specific usage.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a hydraulic device, a member having a bore, the member being laterally ported for fluid passage, a helically formed bimetallic thermostat in said bore, one end of the thermostat being fixed to the member at an end of said bore, a ported sleeve fixed to the other end of said thermostat for rotation therewith in response to temperature changes, a tube within said thermostat having a port registering with the sleeve port and rotationally adjustably mounted in said member, for temperature calibration of sleeve and tube port opening overlap, and means at the other end of said member, bearing upon said sleeve, for adjusting the axial position of the port thereof relative to said tube port.

2. In a hydraulic device, a helical bimetal thermostat having a ported sleeve at one end, a ported tube within said thermostat, the port thereof being registrable with the sleeve port, said sleeve being rotatable in response to temperature change of the thermostat to change the effective area through said ports and said tube being manually rotatably adjustable to change the rotational relationship of said tube and sleeve ports for temperature calibration, and means for changing the axial relationship of said tube and sleeve ports for calibration of the effective area thereof without respect to temperature.

3. In a temperature controlled hydraulic device, a pair of coacting ported tubular members, one embracing the other, and relatively movable in two directional senses for changing the overlap of said ports and the net effective area thereof, a bimetal thermostat fixed to one member for moving same in response to temperature changes, effective to change the port overlap, and means for relatively moving said members in the other directional sense for adjusting the net port opening therebetween regardless of temperature.

4. In a hydraulic shock absorber having formed therein a bore, said bore being open at one end only to a communicating fluid passage, a composite valve structure within said bore for controlling the flow of fluid therethrough, said valve structure comprising ported tubular members, one embracing the other, and relatively movable in two directions to control the area of the net port opening, means responsive to temperature for effecting said movement in one direction, and manual means for adjustably effecting said movement in the other direction.

5. A valve assembly for a hydraulic device comprising a ported tube, a ported sleeve, the ports being registrable and relatively movable to provide an orifice of variable effective area, temperature responsive means for relatively moving said tube and sleeve rotationally to vary the effective orifice area, and means manually operable to relatively move said tube and sleeve axially as a separate control for the effective orifice area.

6. In a hydraulic shock absorber, a composite valve structure including a ported sleeve member and a ported tubular member, one embracing the other, said members being relatively movable in two directions to control the effective area of the port opening, means responsive to temperature changes to vary the effective area of said opening by the relative rotation of one said member, the other said member being manually relatively rotatably movable to adjust said temperature responsive means for calibration thereof, and means manually operable wholly independently of said first mentioned manual means as well as wholly independently of any temperature changes to vary the effective area of said opening by relative axial movement of one said member relatively to the other.

7. In a hydraulic shock absorber, a composite valve structure including a ported sleeve member and a ported tubular member, one embracing the other, said members being relatively movable in two directions to control the effective area of the port opening, means responsive to temperature changes to vary the effective area of said opening by the relative rotation of one said member, and means manually operable to vary the effective area of said opening by relative axial movement of one said member.

ADOLPH PETELER.